United States Patent
Qiu et al.

(10) Patent No.: US 9,049,209 B2
(45) Date of Patent: Jun. 2, 2015

(54) METHODS AND APPARATUS TO ROUTE A COMMUNICATION SESSION IN AN INTERNET PROTOCOL (IP) MULTIMEDIA SUBSYSTEM (IMS) NETWORK

(75) Inventors: Chaoxin Charles Qiu, Austin, TX (US); Bernard Ku, Austin, TX (US); Mehrad Yasrebi, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1552 days.

(21) Appl. No.: 11/745,813

(22) Filed: May 8, 2007

(65) Prior Publication Data

US 2008/0281975 A1 Nov. 13, 2008

(51) Int. Cl.
*H04L 29/06* (2006.01)
*H04L 29/08* (2006.01)
*G06F 15/16* (2006.01)

(52) U.S. Cl.
CPC .......... *H04L 65/1069* (2013.01); *H04L 69/329* (2013.01); *H04L 29/06* (2013.01); *H04L 65/104* (2013.01); *H04L 65/1016* (2013.01)

(58) Field of Classification Search
USPC .......................................... 709/230; 370/356
See application file for complete search history.

(56) References Cited

U.S. PATENT DOCUMENTS

| | | | | |
|---|---|---|---|---|
| 6,678,265 B1 * | 1/2004 | Kung et al. | ................... | 370/352 |
| 6,694,145 B2 * | 2/2004 | Riikonen et al. | ............... | 455/502 |
| 6,724,876 B2 * | 4/2004 | Williams et al. | ......... | 379/207.02 |
| 6,735,209 B1 * | 5/2004 | Cannon et al. | ................. | 370/401 |
| 6,735,621 B1 * | 5/2004 | Yoakum et al. | ................ | 709/218 |
| 6,741,585 B1 * | 5/2004 | Munoz et al. | ................. | 370/352 |
| 6,757,704 B1 * | 6/2004 | Denker et al. | ................ | 709/202 |
| 6,763,103 B1 * | 7/2004 | Willrett | .......................... | 379/229 |
| 6,771,639 B1 * | 8/2004 | Holden | .......................... | 370/352 |
| 6,819,667 B1 * | 11/2004 | Brusilovsky et al. | ......... | 370/354 |
| 6,839,421 B2 * | 1/2005 | Ferraro Esparza et al. | .......................... | 379/220.01 |
| 6,909,708 B1 * | 6/2005 | Krishnaswamy et al. | ..... | 370/352 |
| 6,917,612 B2 * | 7/2005 | Foti et al. | ........................ | 370/352 |
| 6,937,563 B2 * | 8/2005 | Preston et al. | ................. | 370/230 |
| 6,937,597 B1 * | 8/2005 | Rosenberg et al. | ............ | 370/356 |
| 6,937,713 B1 * | 8/2005 | Kung et al. | ................ | 379/211.02 |
| 7,031,450 B2 | 4/2006 | Evslin | | |
| 7,035,260 B1 * | 4/2006 | Betta et al. | ..................... | 370/392 |
| 7,035,384 B1 * | 4/2006 | Scherer | ....................... | 379/88.19 |
| 7,260,384 B2 * | 8/2007 | Bales et al. | ..................... | 455/413 |
| 7,277,421 B1 * | 10/2007 | Pershan | ......................... | 370/352 |
| 7,289,493 B1 * | 10/2007 | Vera | ........................... | 370/356 |
| 7,298,833 B2 * | 11/2007 | Klein et al. | .............. | 379/201.02 |
| 7,453,827 B2 * | 11/2008 | Toyoda | .......................... | 370/260 |
| 7,525,930 B2 * | 4/2009 | Fridman et al. | ................ | 370/259 |
| 7,675,907 B2 * | 3/2010 | Nishida et al. | ................ | 370/352 |
| 7,680,481 B2 * | 3/2010 | Ejzak et al. | ..................... | 455/406 |
| 7,778,238 B2 * | 8/2010 | Miyajima et al. | ............. | 370/352 |
| 7,783,283 B2 * | 8/2010 | Kuusinen et al. | ........... | 455/412.2 |
| 7,881,288 B2 * | 2/2011 | Noldus et al. | ................. | 370/354 |

(Continued)

*Primary Examiner* — Ninos Donabed
(74) *Attorney, Agent, or Firm* — Hanley, Flight & Zimmerman, LLC (57) ABSTRACT

Methods and apparatus to route a communication session in an Internet Protocol (IP) Multimedia Subsystem (IMS) network are disclosed. An example method comprises determining at a tElephone NUMber mapping (ENUM) query server if a called destination associated with an ENUM query request message is subject to re-direction, and determining at the ENUM server a final destination for the called destination when the destination is subject to redirection, the final destination being different from the called destination.

32 Claims, 8 Drawing Sheets

(56) References Cited

U.S. PATENT DOCUMENTS

| | | |
|---|---|---|
| 7,937,463 B2* | 5/2011 | Chadli .................... 709/224 |
| 7,944,912 B2* | 5/2011 | Kobayashi et al. ........... 370/352 |
| 8,140,060 B2* | 3/2012 | De Zen et al. ............... 455/415 |
| 8,345,826 B2* | 1/2013 | Eslambolchi et al. .......... 379/47 |
| 2002/0147845 A1* | 10/2002 | Sanchez-Herrero et al. . 709/245 |
| 2003/0123488 A1* | 7/2003 | Riikonen et al. ............. 370/503 |
| 2004/0057419 A1 | 3/2004 | Stanford |
| 2004/0162094 A1* | 8/2004 | Riikonen et al. ............. 455/502 |
| 2004/0193727 A1* | 9/2004 | Varga et al. .................. 709/238 |
| 2004/0199649 A1* | 10/2004 | Tarnanen et al. ............. 709/230 |
| 2004/0246965 A1 | 12/2004 | Westman et al. |
| 2005/0059384 A1* | 3/2005 | Kuusinen et al. .......... 455/414.1 |
| 2005/0091407 A1* | 4/2005 | Vaziri et al. .................. 709/246 |
| 2005/0195802 A1 | 9/2005 | Klein et al. |
| 2005/0286499 A1 | 12/2005 | Kobayashi et al. |
| 2005/0286531 A1* | 12/2005 | Tuohino et al. ............ 370/395.2 |
| 2006/0029043 A1 | 2/2006 | Nishida et al. |
| 2006/0029045 A1 | 2/2006 | Kobayashi et al. |
| 2006/0034270 A1 | 2/2006 | Haase et al. |
| 2006/0072553 A1 | 4/2006 | Miyajima et al. |
| 2006/0077965 A1* | 4/2006 | Garcia-Martin et al. ..... 370/352 |
| 2006/0077966 A1 | 4/2006 | Miyajima et al. |
| 2006/0083222 A1 | 4/2006 | Miyajima et al. |
| 2006/0084454 A1* | 4/2006 | Sung et al. ................... 455/518 |
| 2006/0092891 A1* | 5/2006 | Goldberg et al. .............. 370/338 |
| 2006/0098621 A1 | 5/2006 | Plata Andres et al. |
| 2006/0153166 A1 | 7/2006 | Kobayashi et al. |
| 2006/0209794 A1 | 9/2006 | Bae et al. |
| 2006/0227959 A1 | 10/2006 | Mitchell |
| 2006/0245573 A1 | 11/2006 | Sheth et al. |
| 2006/0262917 A1 | 11/2006 | Marsico |
| 2006/0286984 A1* | 12/2006 | Bonner ....................... 455/445 |
| 2007/0014294 A1* | 1/2007 | Delaney et al. ............... 370/392 |
| 2007/0019545 A1* | 1/2007 | Alt et al. ...................... 370/230 |
| 2007/0019622 A1* | 1/2007 | Alt et al. ...................... 370/352 |
| 2007/0019623 A1* | 1/2007 | Alt et al. ...................... 370/352 |
| 2007/0022289 A1* | 1/2007 | Alt et al. ...................... 713/168 |
| 2007/0036143 A1* | 2/2007 | Alt et al. ...................... 370/352 |
| 2007/0088836 A1* | 4/2007 | Tai et al. ...................... 709/227 |
| 2007/0121608 A1* | 5/2007 | Gu et al. ...................... 370/356 |
| 2007/0213031 A1* | 9/2007 | Ejzak et al. ................... 455/406 |
| 2008/0019356 A1* | 1/2008 | Marsico ....................... 370/352 |
| 2008/0070543 A1* | 3/2008 | Matuszewski et al. .... 455/404.1 |
| 2008/0137832 A1* | 6/2008 | Heinze et al. ............ 379/220.01 |
| 2008/0168540 A1* | 7/2008 | Agarwal et al. .................. 726/5 |
| 2008/0205267 A1* | 8/2008 | El Barachi et al. ........... 370/230 |
| 2008/0247384 A1* | 10/2008 | Arauz-Rosado et al. ..... 370/352 |
| 2008/0276003 A1* | 11/2008 | Dudley et al. ................. 709/242 |
| 2010/0074417 A1* | 3/2010 | Eslambolchi et al. .......... 379/33 |

* cited by examiner

METHODS AND APPARATUS TO ROUTE A COMMUNICATION SESSION IN AN INTERNET PROTOCOL (IP) MULTIMEDIA SUBSYSTEM (IMS) NETWORK

FIELD OF THE DISCLOSURE

This disclosure relates generally to Internet Protocol (IP) Multimedia Subsystem (IMS) networks and, more particularly, to methods and apparatus to route a communication session in an IMS network.

BACKGROUND

In communication networks, such as Internet Protocol (IP) Multimedia Subsystem (IMS) networks, communication sessions are routed through a communication network from an originating device (e.g., a voice over IP (VoIP) telephone and/or plain old telephone service (POTS) telephone) to a terminating device (e.g., a VoIP telephone and/or a POTS telephone). However, if a particular communication session is to be re-directed at and/or for a particular terminating device and/or a particular subscriber (e.g., the subscriber has activated call forwarding), the communication session is first routed by, through and/or within the communication network to the particular terminating call server, and then is re-directed and/or re-routed by the particular terminating call server (possibly through one or more additional intermediate and/or terminating devices) to a final destination for the communication session.

DETAILED DESCRIPTION

Methods and apparatus to route a communication session in an Internet Protocol (IP) Multimedia Subsystem (IMS) network are disclosed. A disclosed example method includes determining at a tElephone NUMber mapping (ENUM) server if a called destination associated with an ENUM query request message is subject to re-direction, and determining at the ENUM server a final destination for the called destination when the destination is subject to redirection, the final destination being different from the called destination. Another disclosed example methods includes sending an ENUM query request message that specifies a first destination to an ENUM query server, receiving an ENUM response message that specifies a second destination, the second destination different from the first destination, and sending a communication session initiation message to the second destination.

A disclosed example tElephone NUMber mapping (ENUM) server includes a query redirector to identify whether a communication session directed to a first destination specified in an ENUM query request message is to be re-directed based on a redirect flag associated with the first destination, and a call rerouting director to identify at the ENUM server, a final destination for the communication session when the communication session to be re-directed.

In the interest of brevity and clarity, throughout the following disclosure references will be made to the example IMS communication system, the example IMS network 115, the example IP networks 120 and 121, the example access networks 110 and 111, and/or the example IMS devices 105-107 of FIG. 1. Moreover, the following disclosure will utilize SIP messages and/or message exchanges. However, it should be understood that the methods and apparatus to perform cut-through routing of communication sessions are applicable to other VoIP communication systems and/or networks (e.g., based on soft switches), IMS devices, access networks, IP networks, IMS networks and/or IMS communication systems, and/or other types of protocols, messages, and/or message exchanges.

Figure 1:
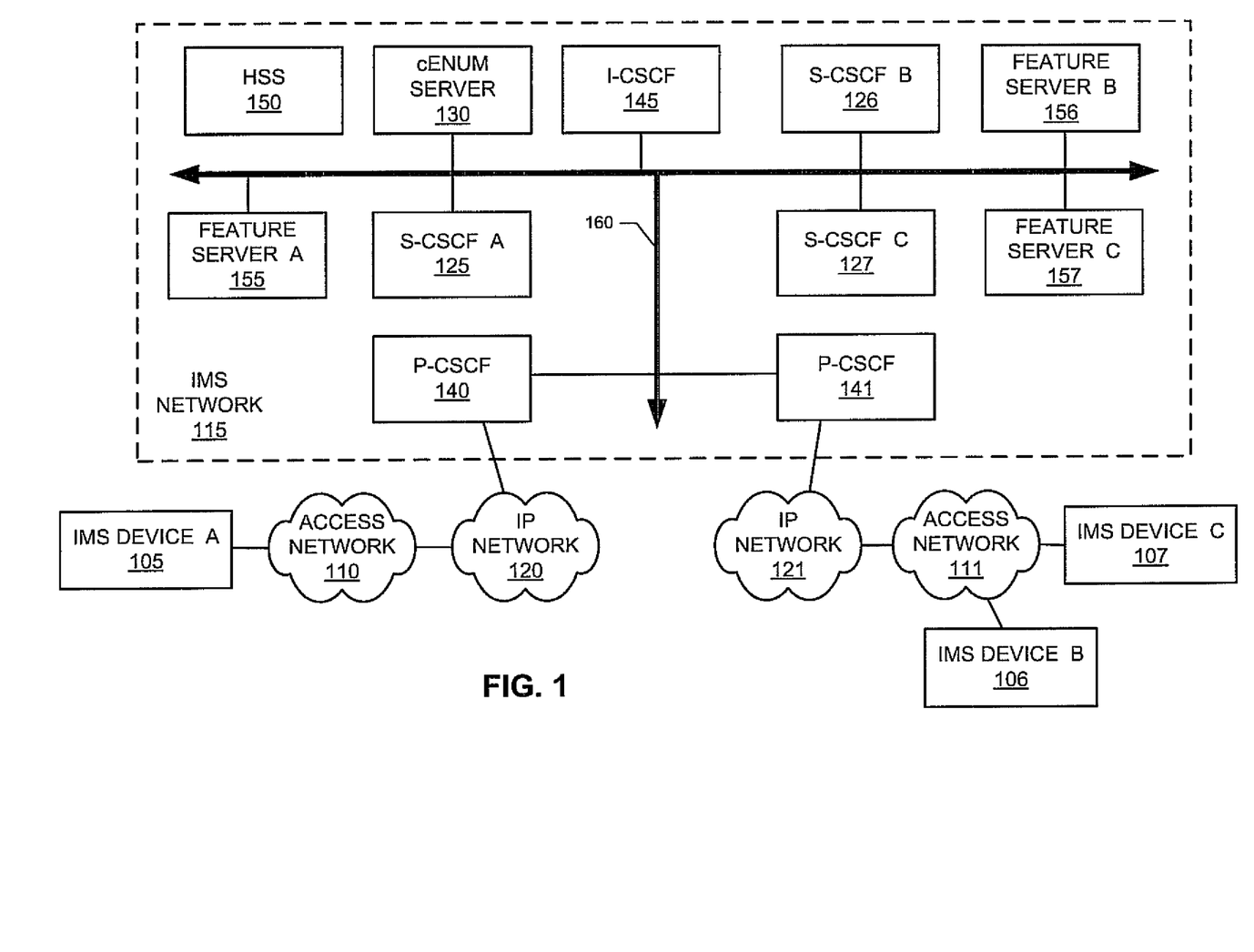
FIG. 1 is a schematic illustration of an example Internet Protocol Multimedia Subsystem (IMS) based communication system constructed in accordance with the teachings of the invention.

FIG. 1 is a schematic illustration of an example Internet Protocol (IP) Multimedia Subsystem (IMS) communication system that includes any number and/or type(s) of IMS devices, three of which are designated at reference numerals 105, 106 and 107. Example IMS devices 105-107 include, but are not limited to, an IMS (e.g., voice over Internet Protocol (VoIP)) phone, an IMS residential gateway, an IMS enabled personal computer (PC), an IMS endpoint, a wireless IMS device (e.g., a wireless-fidelity (WiFi) Internet protocol (IP) phone), an IMS adapter (e.g., an analog telephone adapter (ATA)), an IMS enabled personal digital assistant (PDA), and/or an IMS kiosk. The example IMS devices 105-107 of FIG. 1 may be implemented and/or found at any number and/or type(s) of locations. Further, the IMS devices 105-107 may be fixed location devices, substantially fixed location devices and/or mobile devices. Moreover, the IMS devices 105-107 may have equipment communicatively and/or electrically coupled to them. For example, an IMS ATA may be coupled to a telephone, and/or an IMS residential gateway may be coupled to a PC and/or set-top box.

To access IMS communication services throughout and/or within a site, location, building, geographic area and/or geographic region, the example IMS communication system of FIG. 1 includes any number and/or type(s) of access networks, two of which are designated in FIG. 1 with reference numbers 110 and 111. In general, the example access networks 110 and 111 provide and/or facilitate a communicative coupling of the IMS devices 105-107 to and/or with an IMS network 115, which provides and/or enables IMS communication services to the IMS device 105-107. However, in some examples, one or more of the IMS devices 105-107 may access the IMS network 115 without use of an access network 110, 111. The example access networks 110 and 111 can be implemented using any number and/or type(s) of past, present and/or future standards, specifications, communication devices, networks, technologies and/or systems, such as public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or any combinations and/or hybrids of these devices, systems and/or networks.

While in the illustrated example of FIG. 1, each of the example IMS devices 105-107 are depicted as having an associated access network 110, 111, such depictions are merely illustrative. For example, the example IMS devices 105-107 may utilize a common access network 110, 111, an IMS device 105-107 may be configured and/or capable to utilize more than one access network 110, 111 at the same and/or different times, an IMS device 105-107 may be configured to access the IMS network 115 directly or via the IP network 120 without an intervening access network 110, etc.

To provide IMS communication services (e.g., telephone services, Internet services, data services, messaging services, instant messaging services, electronic mail (email) services, chat services, video services, audio services, gaming services, etc.), the example IMS communication system of FIG. 1 includes one or more IMS networks, one of which is designated in FIG. 1 with reference numeral 115. In IMS networks, such as the example IMS network 115 of FIG. 1, a tElephone NUMber mapping (ENUM) server (e.g., an example enhanced ENUM (cENUM) server 130) is generally used to obtain a session initiation protocol (SIP) uniform resource identifier (URI) for a destination based on the telephone number associated with the destination. The SIP URI is then used by and/or within the IMS network 115 to route a communication session to the destination.

As described more fully below, the example IMS network 115 of FIG. 1 performs "cut-through" communication session routing. That is, an example enhanced ENUM (cENUM) server 130 determines and/or identifies a final destination (e.g., the example IMS device C 107) for a communication session based on an original destination (e.g., the example IMS device B 106) specified in an ENUM query request message received at the cENUM server 130. If communication sessions directed to the original destination are configured to be re-directed, then the final destination will be different than the original destination. However, if communication sessions directed to the original destination are not configured to be re-directed, then the final destination is the same as the original destination. After identifying and/or determining the final destination (which may in some instances be the same as the original destination), the example cENUM server 130 of FIG. 1 returns an ENUM query response message specifying the final destination to the call server that sent the ENUM query request message. Example call servers include, but are not limited to, a serving call session control function (S-CSCF) server, a media gateway control function (MGCF) server, and/or a softswitch. When the call server receives the ENUM query response message from the cENUM server 130, the call server sends a communication session initiation message (e.g., a session initiation protocol (SIP) INVITE message) directly to the final destination rather than to, via and/or through the original destination. In this manner, the communication session is cut-through to the final destination without forwarding through any unnecessary intermediate servers, nodes and/or devices. Thus, the example IMS network 115 of FIG. 1 substantially reduces unnecessary consumption of communication, transport, transmission, server, memory, storage and/or processing resources.

As used herein, the term "destination" refers to a physical entity, device, location and/or subscriber. Generally, re-direction for a destination is controlled at a call server that serves the destination. However, in some examples, a destination may include and/or implement end-point call features (in addition to any implemented by an associated call server) to control their own communication session re-directions. A destination may be specified by any type of logical identifier, such as a telephone number (e.g., an E.164 number) and/or a session initiation protocol (SIP) uniform resource identifier (URI). Moreover, a destination may simultaneously be identified by, specified by and/or associated with more than one identifier. For example, an IMS device 105-107 may be associated with both a telephone number and a SIP URI.

The example IMS network 115 of FIG. 1 may include one or more legacy ENUM servers in addition to the example cENUM server 130. Because the example cENUM server 130 may be used to, over time, transparently replace legacy ENUM servers, the example IMS network 115 of FIG. 1 may include any combination of cENUM servers and legacy ENUM servers. Moreover, because some of the feature servers 155-157 (or destinations to include and/or implement end-point call features) may not be updated (e.g., as described below in connection with FIG. 3) to support cut-through routing, the example cENUM server 130 may not be aware of the re-direction configuration for all destinations. In such mixed configurations (e.g., when not all of the feature servers 155-157 implement the example machine accessible instructions of FIG. 7), some communication sessions will be cut-through routed to their final destinations, while other communication sessions will be routed via their original destination. However, when the example cENUM server 130 is used to determine the SIP URI for an original destination, and if the cENUM server 130 has been provided redirection configuration information for the original destination (e.g., from an updated feature server 155-157 that implements the example machine accessible instructions of FIG. 7), the example cENUM server 130 of FIG. 1 will identify and return the final destination for a communication session directed to the original destination. However, if the cENUM server 130 has not been provided re-direction configuration information for the original destination (e.g., the original destination is associated with a feature server 155-157 that does not implement the example machine accessible instructions of FIG. 7), the example cENUM server 130 operates substantially similar to legacy ENUM servers with regards to that particular original destination. Thus, the cENUM server 130 and/or, more generally, the example IMS network 115 may realize cut-through routing for some destinations, and legacy routing for other destinations. The mixture of cut-through routing and legacy routing implemented by the example IMS network 115 depends on the number of feature servers 155-157 that implement providing redirection configuration information to the cENUM server 130.

In the example IMS communication system of FIG. 1, the example IMS devices 105-107 are communicatively coupled to the example IMS network 115 via one or more of the example access networks 110 and/or 111, and/or any number and/or type(s) of private and/or public IP based communication networks such as, for example, the Internet, two of which are illustrated in FIG. 1 with reference numerals 120 and 121. While in the illustrated example of FIG. 1, each of the example IMS devices 105-107 are depicted as having an associated IP network 120, 121, such depictions are merely illustrative. For example, the example IMS devices 105-107 may utilize the same public IP network, an IMS device 105-107 may be configured and/or capable to utilize more than one IP network 120, 121 at the same and/or different times, etc. In general, the example IP networks 120 and 121 of FIG. 1 provide and/or facilitate a communicative coupling of the IMS devices 105-107 to and/or with the IMS network 115.

In some examples, the IMS devices 105-107 may be communicatively coupled to the access networks 110 and 111 via one or more additional IP based networks and/or devices (not shown), such as a local area network (LAN), a gateway and/or a router located within a place of business, a school and/or a residence. The example IMS devices 105-107 of FIG. 1 are communicatively coupled to the example access networks 110 and 111, the example IP networks 120 and 121 and/or, more generally, the example IMS network 115 via any number and/or type(s) of past, current and/or future communication network(s), communication system(s), communication device(s), transmission path(s), protocol(s), technique(s), specification(s) and/or standard(s). For instance, the example IMS devices 105-107 may be coupled to the example access networks 110 and 111, the example IP networks 120 and 121, and/or the example IMS network 115 via any type(s) of voice-band modem(s), digital subscriber line (DSL) modem(s), cable modem(s), Ethernet transceiver(s), optical transceiver(s), IP virtual private network (VPN) connection(s), Institute of Electrical and Electronics Engineers (IEEE) 802.11x (a.k.a. WiFi) transceiver(s), IEEE 802.16 (a.k.a. WiMax), wireless local area network (WLAN) access point(s), general packet radio services (GPRS) networks in 3G wireless networks, etc. Moreover, any or all of the example IMS network 115, the example access networks 110 and 111, and/or the example IP networks 120 and 121 of FIG. 1 may extend geographically to include one or more locations near to and/or encompassing one or more of the IMS devices 105-107. For example, the access network 110 may include a wireless access point (not shown) by which, for example, a WiFi IP phone 105 connects to the IP network 120 and the IMS network 115.

In the example IMS communication system of FIG. 1, the example access networks 110 and 111, the example IP networks 120 and 121, and the IMS network 115 need not be owned, implemented, and/or operated by a single service provider. For example, the IMS devices 105-107 may access IMS services provided by an IMS network 115 owned, operated and/or implemented by a first service provider via access networks 110 and 111, which are owned, operated and/or implemented by one or more additional service providers. However, any or all of the access networks 110 and 111, the IMS network 115 and/or the IP networks 120 and 121 may be operated by a single service provider.

In the illustrated example IMS communication system of FIG. 1, each IMS device (e.g., the example IMS devices 105-107) that is registered to the example IMS network 115 is associated with and/or assigned to a S-CSCF server (three of which are designated in FIG. 1 with reference numerals 125, 126 and 127). The example S-CSCF servers 125-127 of FIG. 1 are responsible for handling incoming and/or outgoing IMS communication sessions (e.g., telephone calls, and/or data and/or video sessions) associated with its registered IMS devices 105-107.

While three S-CSCF servers 125-127 are illustrated in FIG. 1, the IMS network 115 may include any number and/or type(s) of S-CSCF servers, and each such S-CSCF server may support any number and/or type(s) of IMS devices 105-107.

The example S-CSCF servers 125-127 of FIG. 1 perform session control, maintain session states and/or enable communications with call feature servers (e.g., the example application servers 155-157 of FIG. 1) for its associated and/or registered IMS devices 105-107. For instance, when the calling IMS device A 105 initiates, for example, an outgoing telephone call to the example IMS device B 106, a communication session initiation message (e.g., a SIP INVITE message) is routed by the IMS network 115 from the IMS device A 105 to the S-CSCF server A 125 associated with that particular IMS device A 105.

In response to the communication session initiation message, the example S-CSCF server A 125 sends an ENUM query request message to the example cENUM server 130 to obtain an identifier (e.g., a SIP URI) for the IMS device B 106. If communication services for the IMS device B 106 have been configured to be re-directed to, for example, the IMS device C 107, the cENUM server 130 returns an identifier (e.g., a SIP URI) for the IMS device C 107 instead of an identifier (e.g., a SIP URI) for the IMS device B 106. However, if communication services for the IMS device B 106 have not been configured to be re-directed, the cENUM server 130 returns an identifier (e.g., a SIP URI) for the IMS device B 106. Thus, regardless of whether the IMS device B 106 has communication service re-direction activated, the S-CSCF server A 125 sends a communication session initiation message to the final destination for the communication session. Because the determination of the final destination (e.g., the IMS device B 106 or the IMS device C 107) was made at the example cENUM server 130, the S-CSCF server A 125 need not be aware that the communication session was re-routed. Thus, the example S-CSCF servers 125-127 of FIG. 1 need not be modified, adapted and/or updated to perform cut-through routing as described herein.

To locate and/or identify the final destination for a requested communication session (e.g., directed to a telephone number), the example IMS network 115 of FIG. 1 includes any number of cENUM servers, one of which is designated in FIG. 1 with reference numeral 130. The example cENUM server 130 of FIG. 1 identifies, based upon an ENUM query request message received from an S-CSCF server 125-127, if the original destination specified in the ENUM query request message has re-direction routing enabled. If communication sessions to the original destination are to be re-directed, the example cENUM server 130 of FIG. 1 determines a final destination for the communication session. If communication sessions to the original destination are not to be re-directed, the final destination is the same as the original destination. The example cENUM server 130 then performs, based on the final destination, a lookup of an ENUM database (e.g., the example ENUM database 220 of FIG. 2) to obtain a SIP URI for the final destination. The ENUM database stores and/or represents associations between device identifiers (e.g., E.164 telephone numbers to SIP URIs). Thus, for example, by performing an ENUM lookup, a SIP URI (e.g., an IP address) for the final destination can be identified based upon a called telephone number assigned to the final destination. However, the ENUM database may store any number and/or type(s) of associations between any number and/or type(s) of identifiers. In some examples, a final destination associated with and/or configured to an original destination may already be a URI (e.g., a SIP URI, an application URI and/or an hypertext transfer protocol (HTTP) URI) and, thus, the ENUM database lookup need not be performed. An example manner of implementing the example cENUM server 130 is described below in connection with FIG. 2.

To provide an access entry point for an IMS device 105-107 into the IMS network 115, the example IMS network 115 of FIG. 1 includes any number and/or type(s) of proxy call session control function (P-CSCF) servers, two of which are designated in FIG. 1 with reference numerals 140 and 141. The example P-CSCF servers 140 and 141 of FIG. 1, among other things, route SIP messages between IMS devices 105-107 and their associated S-CSCF servers 125-127.

To locate and/or identify the S-CSCF server 125-127 associated with an IMS device 105-107, the example IMS network 115 of FIG. 1 includes any number and/or type(s) of interrogating call session control function (I-CSCF) servers, one of which is designated in FIG. 1 with reference number 145. The example I-CSCF server 145 of FIG. 1 serves as a contact point within the example IMS network 115 for connections destined for an IMS device 105-107 of the IMS communication system, and/or for an IMS device 105-107 currently located within the serving area of the IMS communication system (e.g., a roaming subscriber). For example, for a final destination identified by the example cENUM server 130, the example I-CSCF 145 identifies to which S-CSCF server 125-127 the final destination IMS device 105-107 is registered. IMS protocol messages directed to the destination IMS device 105-107 are then routed to the S-CSCF server 125-127 identified by the I-CSCF 145.

To manage subscriber information, and/or to enable subscribers and/or servers to locate other servers, subscribers and/or destinations, the example IMS network 115 of FIG. 1 includes any number and/or type(s) of home subscriber server(s) (HSSs), one of which is designated in FIG. 1 with reference numeral 150. The example HSS 150 of FIG. 1 maintains a device profile and/or one or more preferences for each subscriber and/or IMS device 105-107 of the IMS network 115. The example I-CSCF server 145 of FIG. 1 uses information contained in the HSS 150 to, for example, determine and/or locate the S-CSCF server 125-127 associated with a particular subscriber and/or IMS device 105-107.

To provide one or more additional call features, the example IMS network 115 of FIG. 1 includes any number and/or type(s) of application servers, three of which are designated in FIG. 1 with reference numerals 155, 156 and 157. The example application servers 155-157 of FIG. 1 provide and/or implement additional service features to subscribers (e.g., call barring, calling name delivery and/or blocking, call blocking, call forward, call forking, call trace, voicemail, announcement servers, call trees, etc.). Example application servers 155-157 include, but are not limited to, voice over Internet protocol (VoIP) feature servers. The application servers 155-157 may be used to provide and/or implement call features and/or services for both calling and/or called parties.

As illustrated in FIG. 1, the example S-CSCF servers 125-127, the example exception cENUM server 130, the example P-CSCF servers 140 and 141, the example I-CSCF server 145, the example HSS 150, and/or the example application servers 155-157 communicate and/or are communicatively coupled via any number, type(s) and/or combination of communication paths, communication networks, busses and/or communication devices 160.

While an example IMS communication system, example IMS devices 105-107, and an example IMS network 115 have been illustrated in FIG. 1, the devices, networks, systems, servers and/or processors illustrated in FIG. 1 may be combined, divided, re-arranged, eliminated and/or implemented in any way. For example, it will be readily appreciated by persons of ordinary skill in the art that the example S-CSCF servers 125-127, the example exception cENUM server 130, the example P-CSCF servers 140 and 141, the example I-CSCF server 145, the example HSS 150, and/or the example application servers 155-157 illustrated in FIG. 1 are logical entities of the example IMS network 115. They may, therefore, be implemented separately and/or in any combination using, for example, machine accessible instructions executed by one or more computing devices and/or computing platforms. Further, the example IMS devices 105-107, the example S-CSCF servers 125-127, the example exception cENUM server 130, the example P-CSCF servers 140 and 141, the example I-CSCF server 145, the example HSS 150, the example application servers 155-157 and/or, more generally, the example IMS network 115 may be implemented by hardware, software, firmware and/or any combination of hardware, software and/or firmware. Further still, the example IMS communication system, the example IMS devices 105-107 and/or the example IMS network 115 may include additional devices, servers, systems, networks, gateways, portals, and/or processors in addition to, or instead of, those illustrated in FIG. 1, and/or may include more than one of any or all of the illustrated devices, servers, networks, systems, gateways, portals, and/or processors. For example, an IMS network 115 may include any number and/or type(s) of media gateways, media gateway control function (BGCF) servers, breakout gateway control function (BGCF) severs and/or session border controllers.

Figure 2:
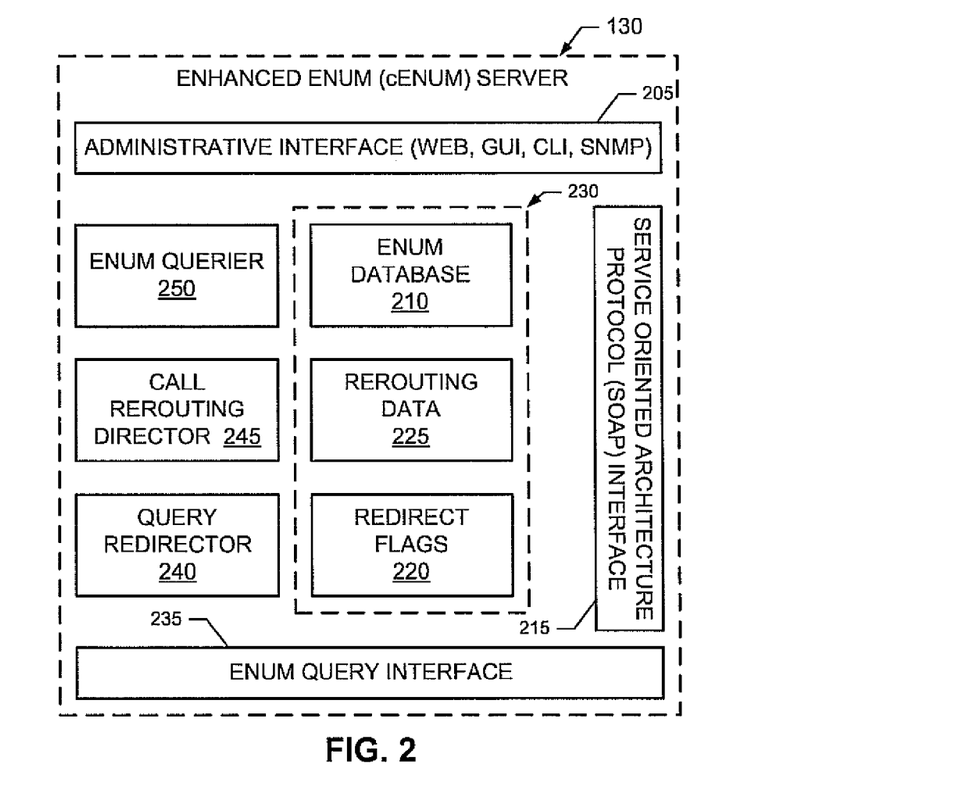
FIG. 2 illustrates an example manner of implementing the example enhanced ENUM (cENUM) server of FIG. 1.

FIG. 2 illustrates an example manner of implementing the example cENUM server 130 of FIG. 1. To allow the example cENUM server 130 of FIG. 2 to be administered, the example cENUM server 130 includes any type of administrative interface 205. The example administrative interface 205 of FIG. 2 may be implemented one or more of a command-line interface (CLI), a graphical user interface (GUI), a web-based interface, and/or a simple network management protocol (SNMP) interface. The example administrative interface 205 may be used to remotely administer and/or configure the example cENUM server 130, and/or to configure and/or load an ENUM database 210 used to perform ENUM lookups.

To allow feature servers (e.g., the example feature servers 155-157 of FIG. 1) to configure, update and/or otherwise provide re-direction information and/or data, the example cENUM server 130 of FIG. 1 includes a service oriented architecture protocol (SOAP) interface 215. The example SOAP interface 215 of FIG. 2 allows feature servers to notify the cENUM server 130 whether communication sessions directed to a particular destination are to be re-directed. That is the example SOAP interface 215 is used by feature servers to set a redirect flag 220 for a particular destination. For example, a first value (e.g., a logical "TRUE") may be used to indicate that communication sessions are to be re-directed (i.e., are subject to redirection) while a second value (e.g., a logical "FALSE) may be used to indicate that communication sessions are not to be re-directed. Additionally, if communication sessions are to be re-directed, the feature servers use the SOAP interface 215 to update, change and/or modify rerouting data 225 to configure and/or define the destination to which communication sessions are to be re-directed. In other examples, the interface 215 may be implemented using an open application programming interface (API) such as, for example, JAVA and/or common object request broker architecture (CORBA).

The example ENUM database 210, the example redirect flags 220 and/or the example rerouting data 225 may be implementing using any number and/or type(s) of data structures, and may be stored in and/or within any number and/or type(s) of memories and/or memory devices 230. An example data structure that may be used to implement the example redirect flags 220 of FIG. 2 is described below in connection with FIG. 4. An example data structure that may be used to implement the example rerouting data 225 of FIG. 2 is described below in connection with FIG. 5.

While in the illustrated example of FIG. 2, the ENUM database 210, the example redirect flags 220 and the example rerouting data 225 are implemented with separate data structures, they may be implemented using one or more combined data structures. However, by implementing the ENUM database 210 separately from the redirect flags 220 and/or the rerouting data 225, the ENUM database 210 can remain substantially static, and the ENUM querier 250 can be implemented to maintain the high efficiencies and/or high real-time throughputs typically associated with ENUM queriers. Additionally, by separating the ENUM database 210 from the redirect flags 220 and/or the rerouting data 225, the ENUM database 210 need not be implemented to support updates by the example feature servers 155-157.

To allow call servers (e.g., the example S-CSCF servers 125-127 of FIG. 1) to perform ENUM queries, the example cENUM server 130 of FIG. 2 includes any type of ENUM query interface 235. Using any message(s), format(s) and/or protocol(s) (e.g., in accordance with Internet Engineering Task Force (IETF) Request for Comment (RFC) 3761), the example ENUM query interface 235 of FIG. 2 exchanges ENUM query request messages and ENUM query response messages with call servers.

To allow the example cENUM server 130 of FIG. 2 to locate a final destination for a communication session, the example cENUM server 130 of FIG. 2 includes a query redirector 240 and a call rerouting director 245. When an ENUM query request message is received at the cENUM server 130, the example query redirector 240 of FIG. 2 checks the value of a redirect flag 220 for the original destination specified in the ENUM query request message. If the redirect flag 220 for the original destination indicates that the communication session is to be re-directed and/or is subject to redirection (e.g., has a logical value of "TRUE"), the example query redirector 240 directs the example call rerouting director 245 to identify the final destination for the communication session. If the redirect flag 220 for the original destination indicates that the communication session is not to be re-directed (e.g., has a logical value of "FALSE") (i.e., the final destination of the communication session is the same as the original destination), the example query redirector 240 directs an ENUM querier 250 to perform an ENUM lookup in the ENUM database 210 to identify a SIP URI for the original destination.

When directed by the example query redirector 240, the example call rerouting director 245 of FIG. 2 accesses and/or performs one or more lookups of the rerouting data 225 and/or the redirect flags 220 to identify a final destination for a communication session. For example, the call rerouting director 245 performs a first lookup of the rerouting data 225 to obtain a first destination identifier based upon the original destination specified in the ENUM query request message. The call rerouting director 245 next performs a lookup of the redirect flags 220 to determine if the destination associated with the first destination identifier is also being re-directed and, if so, performs a second lookup of the rerouting data 225 based on the first destination identifier to obtain a second identifier. The process continues until the call rerouting director 245 identifies and/or obtains a final destination identifier that is not re-directed. The call rerouting director 245 then directs the example ENUM querier 250 to perform an ENUM lookup to obtain a SIP URI for the final destination. However, if the final destination identifier is already a URI (e.g., a SIP URI, an application URI and/or an HTTP URI), the final destination identifier may be returned via the ENUM query interface 235 to the call server without performing the ENUM lookup.

To perform ENUM lookups, the example cENUM server 130 of FIG. 2 includes any type of example ENUM querier 250. As directed by the example query redirector 240 and/or the example call rerouting director 245, using any method(s), algorithm(s) and/or logic, the example ENUM querier 250 of FIG. 2 performs a lookup of the ENUM database 210 to identify a SIP URI associated with a telephone number. In some examples, the ENUM database 210 is implemented using one or more legacy ENUM servers.

While an example manner of implementing the example cENUM server 130 of FIG. 1 has been illustrated in FIG. 2, one or more of the data structures, elements, processes and/or devices illustrated in FIG. 2 may be combined, divided, re-arranged, omitted, eliminated and/or implemented in any other way. Further, the example interfaces 205, 215 and 235, the example databases 210, 220 and 225, the example query redirector 240, the example call rerouting director 245, the example ENUM querier 250 and/or, more generally, the example cENUM server 130 may be implemented by hardware, software, firmware and/or any combination of hardware, software and/or firmware. Further still, the example cENUM server 130 may include data structures, elements, processes and/or devices instead of, or in addition to, those illustrated in FIG. 2 and/or may include more than one of any or all of the illustrated data structures, elements, processes and/or devices.

Figure 3:
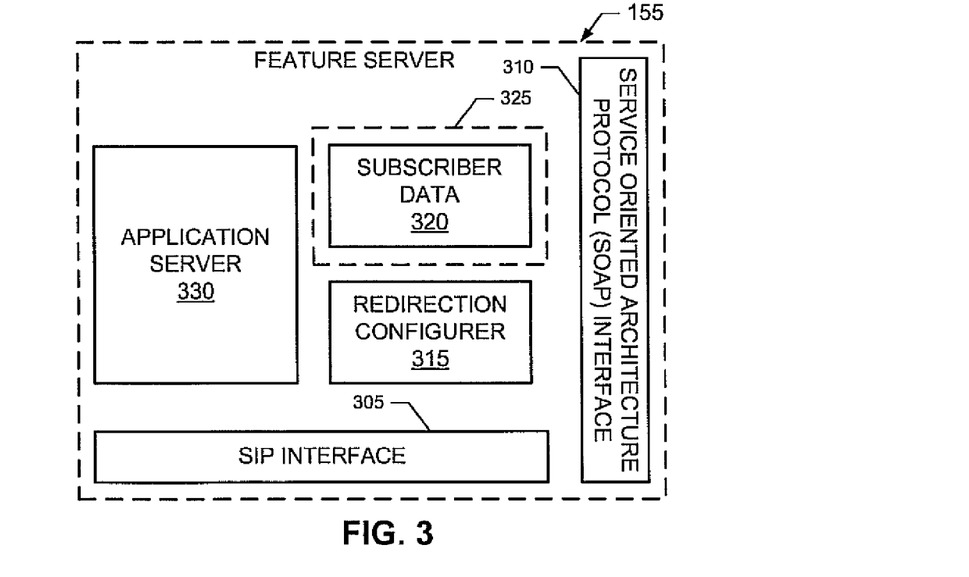
FIG. 3 illustrates an example manner of implementing any or all of the example feature servers of FIG. 1.

FIG. 3 illustrates an example manner of implementing any or all of the example feature servers 155-157 of FIG. 1. While any or all of the example feature servers 155-157 of FIG. 1 may be represented by FIG. 3, for ease of discussion, the device of FIG. 3 will be referred to as feature server 155. To allow the example feature server 155 of FIG. 3 to operate as a SIP feature server, the example feature server 155 includes a SIP interface 305. The example SIP interface 305 of FIG. 3 allows the feature server 155 to exchange (e.g., send and/or receive) any type of SIP messages with other device(s) and/or server(s) of the example IMS communication system of FIG. 1 (e.g., any of the example S-CSCF servers 125-127).

To allow the example feature server 155 of FIG. 3 to configure, update and/or otherwise provide re-direction information to, for example, the cENUM server 130 of FIG. 1, the example feature server 155 includes a SOAP interface 310. The example SOAP interface 310 of FIG. 3 is used to notify the cENUM server 130 whether communication sessions directed to a particular destination are to be re-directed. That is the SOAP interface 310 is used by a redirection configurer 315 to set and/or define a redirect flag (e.g., one of the example redirect flags 220 of FIG. 2) for a particular destination. For example, a first value (e.g., a logical "TRUE") may be used to indicate that communication sessions are subject to redirection while a second value (e.g., a logical "FALSE) may be used to indicate that communication sessions are not to be re-directed. Additionally, when communication sessions are to be re-directed, the example redirection configurer 315 uses the SOAP interface 310 to update, configure and/or define rerouting data (e.g., the example rerouting data 225) to configure the destination to which communication sessions are to be re-directed. In some examples, the interface 310 may be implemented using an open application programming interface (API) such as, for example, JAVA and/or CORBA.

The example redirection configurer 315 of FIG. 3 also interacts with a subscriber (e.g., via an interactive voice response (IVR) system and/or web portal) to allow a subscriber to enable and/or disable communication session redirection, and/or to configure a redirection destination. After the subscriber completes the re-direction configuration, the example redirection configurer 315 provides the redirection information and/or data to the cENUM server 130 via the example SOAP interface 310.

To store subscriber information, the example feature server 155 of FIG. 3 includes subscriber data 320. The example subscriber data 320 of FIG. 3 stores and/or includes any necessary data required to provide call features for subscribers associated with the feature server 155. The example subscriber data 320 may, additionally or alternatively, store one or more values that represent communication session re-directions to be performed by the feature server 155 and/or the cENUM server 130. For example, if a legacy ENUM server is used to obtain a SIP URI for an original destination, call re-direction may still have to be performed by the example feature server 155, using a prior art technique. The subscriber data 320 may be stored and/or implemented by any type of data structure(s), and/or stored in any number and/or type(s) of memories and/or memory devices 325. In some examples, the subscriber data 320 is stored separately from the feature server 155. For example, the subscriber data 320 could be stored in the example HSS 150.

To implement call services and/or features, the example feature server 155 of FIG. 3 includes any number and/or type(s) of application servers, one of which is designated at reference numeral 330. The example application server 330 of FIG. 3 implements any call services and/or features such as, for example, call barring, call name delivery, call name blocking, call blocking, call forwarding, call forking, call trace, and/or voicemail.

While an example manner of implementing any or all of the example feature servers 155-157 of FIG. 1 has been illustrated in FIG. 3, one or more of the data structures, elements, processes and/or devices illustrated in FIG. 3 may be combined, divided, re-arranged, omitted, eliminated and/or implemented in any other way. Further, the example interfaces 305 and 310, the example subscriber database 320, the example redirection configurer 315, the example application server 330 and/or, more generally, the example feature servers 155-177 may be implemented by hardware, software, firmware and/or any combination of hardware, software and/or firmware. Further still, the example feature servers 155-157 may include data structures, elements, processes and/or devices instead of, or in addition to, those illustrated in FIG. 3 and/or may include more than one of any or all of the illustrated data structures, elements, processes and/or devices.

Figure 4:
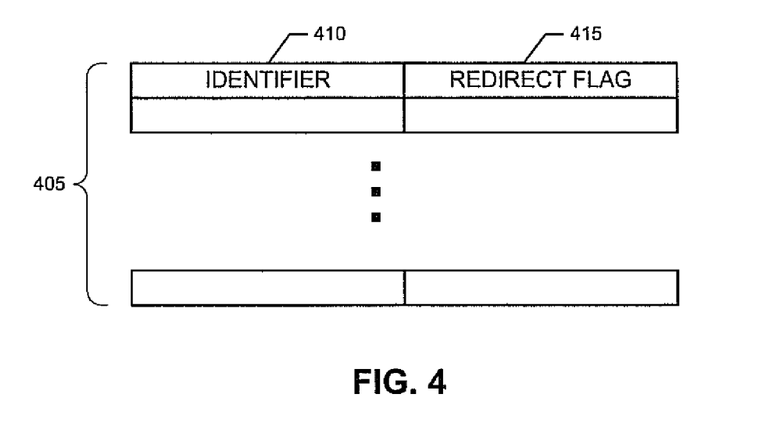
FIG. 4 illustrates an example data structure that may be used to implement the example redirect flags of FIG. 2.

FIG. 4 illustrates an example data structure that may be used to implement the example redirect flags 220 of FIG. 2. The example data structure of FIG. 4 includes a plurality of entries 405 for respective ones of a plurality of destinations supported by the cENUM server 130 that implements and/or includes the data structure of FIG. 4. To identify a destination, each of the example entries 405 of FIG. 4 includes an identifier field 410. The example identifier field 410 of FIG. 4 contains one or more values and/or strings that uniquely identifies a destination. An example identifier is an E.164 telephone number.

To indicate whether a destination has communication session re-direction activated, each of the example entries 405 of FIG. 4 includes a redirect flag field 415. The example redirect flag field 415 of FIG. 4 contains a first value (e.g., a logical "TRUE") if communication sessions to the destination are currently subject to redirection, or a second value (e.g., a logical "FALSE") if re-directing is not currently active for the destination.

Figure 5:
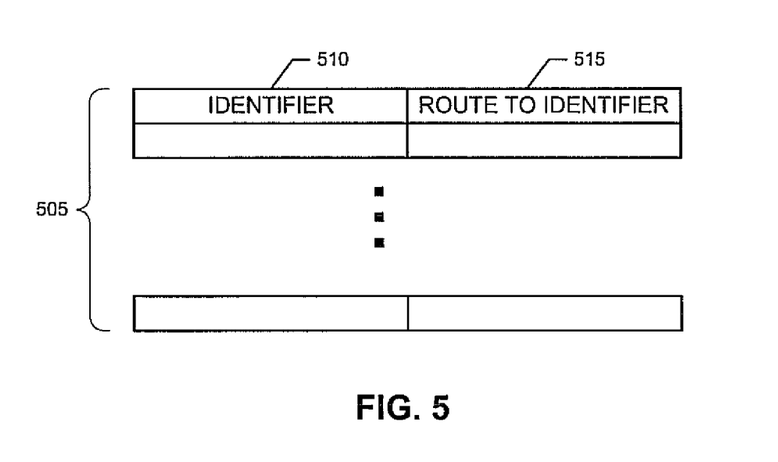
FIG. 5 illustrates an example data structure that may be used to implement the example rerouting data of FIG. 2.

FIG. 5 illustrates an example data structure that may be used to implement the example rerouting data 225 of FIG. 2. The example data structure of FIG. 5 includes a plurality of entries 505 for respective ones of a plurality of destinations supported by a cENUM server 130 that implements and/or includes the data structure of FIG. 5. To identify a destination, each of the example entries 505 of FIG. 5 includes an identifier field 510. The example identifier field 510 of FIG. 5 contains one or more values and/or strings that uniquely identify a destination. An example identifier is an E.164 telephone number.

To identify a destination to which a communication session is to be re-directed, each of the example entries 505 of FIG. 5 includes a "route to identifier" field 515. The example route to identifier field 515 of FIG. 5 contains one or more values and/or strings that uniquely identify a destination. Example identifiers include an E.164 telephone number and a SIP URI.

By using the example data structures of FIGS. 4 and/or 5, the example cENUM 130 of FIG. 1 can a) determine whether a communication session directed to a destination is to be re-directed (e.g., by examining the value of the example redirect flag field 415 for the destination), and b) if the communication session is to be re-directed, determine the destination to which the communication session is to be re-directed (e.g., by examining the value of the example route to identifier field 515 for the destination). Persons of ordinary skill in the art will readily recognize that the data structures of FIGS. 4 and/or 5 may be used to trace through a string of one or more re-directions to identify the final destination for a communication session.

While example data structures that may be used to implement the example redirect flags 220 and the example rerouting data 225 of FIG. 2 are illustrated in FIGS. 4 and 5, the example data structures of FIGS. 4 and/or 5 may be implemented using any number and/or type(s) of other and/or additional entries, fields and/or data. Further, the entries, fields and/or data illustrated in FIGS. 4 and/or 5 may be combined, divided, re-arranged, eliminated and/or implemented in any way. For example, the example redirect flags 220 and the example rerouting data 225 may be implemented using a single data structure. Moreover, the example data structures may include entries, fields and/or data in addition to, or instead of, those illustrated in FIGS. 4 and/or 5, and/or may include more than one of any or all of the illustrated entries, fields and/or data.

Figure 6:
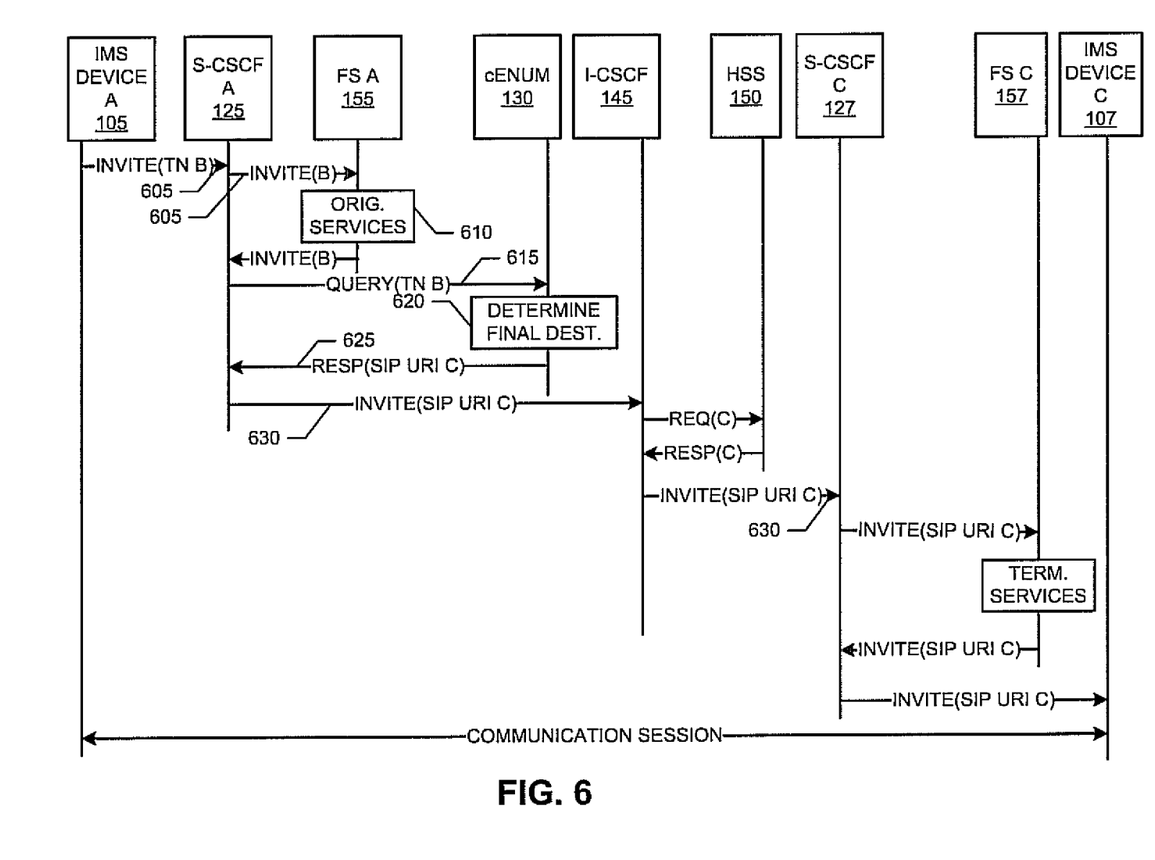
FIGS. 6 and 7 illustrates example protocol message exchanges and flowcharts representative of machine accessible instructions that may be executed to implement any or all of the example cENUM servers, the example feature servers and/or, more generally, the example IMS network of FIGS. 1, 2 and/or 3.
Figure 7:
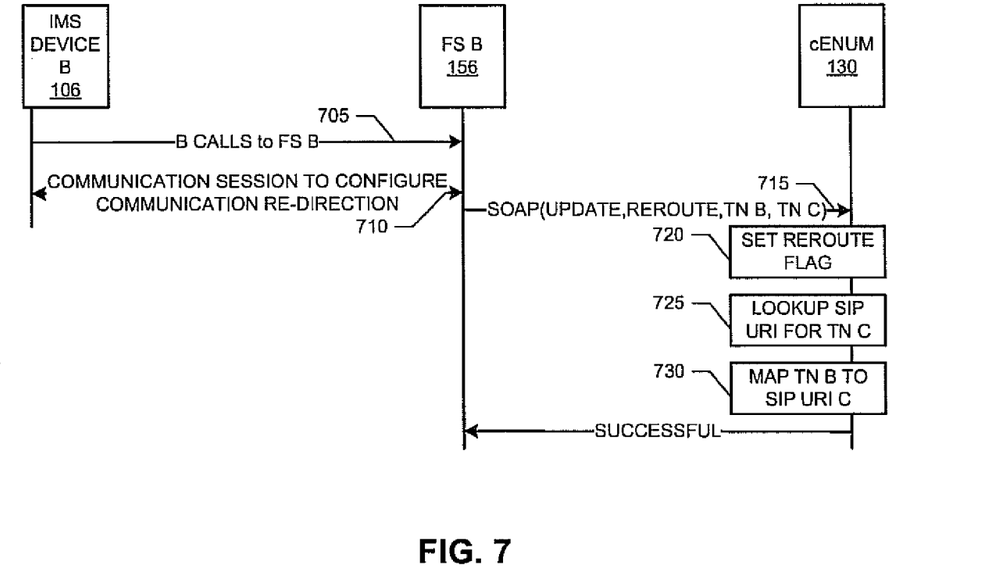

FIGS. 6 and 7 illustrate example protocol message exchanges, and flowcharts representative of machine accessible instructions that may be executed to implement the example cENUM servers 130, the example feature servers 155-157 and/or, more generally, the example IMS network 115 of FIGS. 1-3. The example exchanges and/or the example machine accessible instructions of FIGS. 6 and/or 7 may be carried out by a processor, a controller and/or any other suitable processing device. For example, the example exchanges and/or the example machine accessible instructions of FIGS. 6 and/or 7 may be embodied in coded instructions stored on a tangible medium such as a flash memory, a read-only memory (ROM) and/or random-access memory (RAM) associated with a processor (e.g., the example processor 1005 discussed below in connection with FIG. 10). Alternatively, some or all of the example exchanges and/or the example machine accessible instructions of FIGS. 6 and/or 7 may be implemented using any combination(s) of application specific integrated circuit(s) (ASIC(s)), programmable logic device(s) (PLD(s)), field programmable logic device(s) (FPLD(s)), discrete logic, hardware, firmware, software, etc. Also, some or all of the example exchanges and/or the example machine accessible instructions of FIGS. 6 and/or 7 may be implemented manually or as any combination(s) of any of the foregoing techniques, for example, any combination of firmware, software, discrete logic and/or hardware. Persons of ordinary skill in the art will readily appreciate that many other methods of implementing the example cENUM servers 130, the example feature servers 155-157 and/or, more generally, the example IMS network 115 of FIGS. 1-3 may be employed. For example, the order of execution of the blocks of the example flowcharts and/or the example exchanges of FIGS. 6 and/or 7 may be changed, and/or some of the blocks and/or exchanges described may be changed, eliminated, sub-divided, and/or combined. Additionally, persons of ordinary skill in the art will appreciate that any or all of the example exchanges and/or the example machine accessible instructions of FIGS. 6 and/or 7 may be carried out sequentially and/or carried out in parallel by, for example, separate processing threads, processors, devices, discrete logic, circuits, etc.

The example protocol message exchanges of FIG. 6 begin with the example IMS device A 105 sending a communication session initiation message 605 (e.g., a SIP INVITE message), which specifies IMS device B 106 as the original destination, to its associated S-CSCF server A 125. The S-CSCF server A 125 forwards the initiation message 605 to the feature server (FS) A 155, which performs, carries out and/or implements originating call features (if any) for the IMS device A 105 (block 610).

When the feature server A 155 is done performing originating call features (block 610), it returns an updated version of the initiation message to the S-CSCF server 125. The example S-CSCF server A 125 sends an ENUM query request message 615 specifying the telephone number of the IMS device B 106 to the example cENUM server 130. Based on the telephone number of IMS device B 106 (TN B), the cENUM server 130 determines a final destination for the requested communication session (block 620). In the illustrated example of FIG. 6, IMS device B 106 has its communication sessions re-directed to IMS device C 107 and, thus, the cENUM server 130 responds with an ENUM response message 625 that specifies a SIP URI for IMS device C 107 (SIP URI C).

The S-CSCF server A 125 then sends and/or forward a communication session initiation message 630 (e.g., a SIP INVITE message) to the S-CSCF server C 127 associated with the IMS device C 107. For example, as illustrated in FIG. 6, the S-CSCF server A 125 sends the SIP INVITE message 630 to the I-CSCF 125. The I-CSCF 125 identifies the S-CSCF server C 127 by querying the HSS 150, and then forwards the SIP INVITE message to the S-CSCF server C 127. Following the SIP INVITE message 630, the communication session may continue being established in accordance with techniques performed in the industry including, if applicable, the implementation of any terminating call features for the IMS device C 107.

FIG. 7 illustrate additional example protocol message exchanges, and flowcharts representative of machine accessible instructions that may be executed to implement the example cENUM servers 130, the example feature servers 155-157 and/or, more generally, the example IMS network 115 of FIGS. 1-3. As described above, not all of the feature servers 155-157 need to implement the example protocol exchanges of FIG. 7. For the feature servers 155-157 that implement the example protocol exchanges of FIG. 7, the cENUM 130 will be able to perform cut-through routing. The example protocol message exchanges of FIG. 7 begin with an IMS device B 106 initiating 705 a communication session 710 (e.g., an interactive voice response (IVR) session and/or web portal session) with its associated feature server (FS) B 156.

In the illustrated example of FIG. 7, a user of the IMS device B 106 provides re-direction configuration data and/or information 715 to the cENUM 130 to (re-) configure communication session re-direction for the IMS device B 106 and, thus, the feature server B 156 using a SOAP interface (e.g., any of the example SOAP interfaces 215 and 310 of FIGS. 2 and 3). In the example of FIG. 7, telephone calls directed to the telephone number for IMS device B 106 (TN B) are to be re-directed to the telephone number for IMS device C 107 (TN C). The cENUM 130 sets the redirect flag 415 (FIG. 4) for TN B (e.g., to a logical value of "TRUE") (block 720), performs an ENUM lookup to obtain the SIP URI for TN C (block 725), and sets the route to identifier 515 (FIG. 5) for TN B to the SIP URI for TN C (block 730). Persons of ordinary skill in the art will readily appreciate that the example protocol exchanges of FIG. 7 may be used to configure re-direction for any type(s) of communication sessions.

Figure 8:
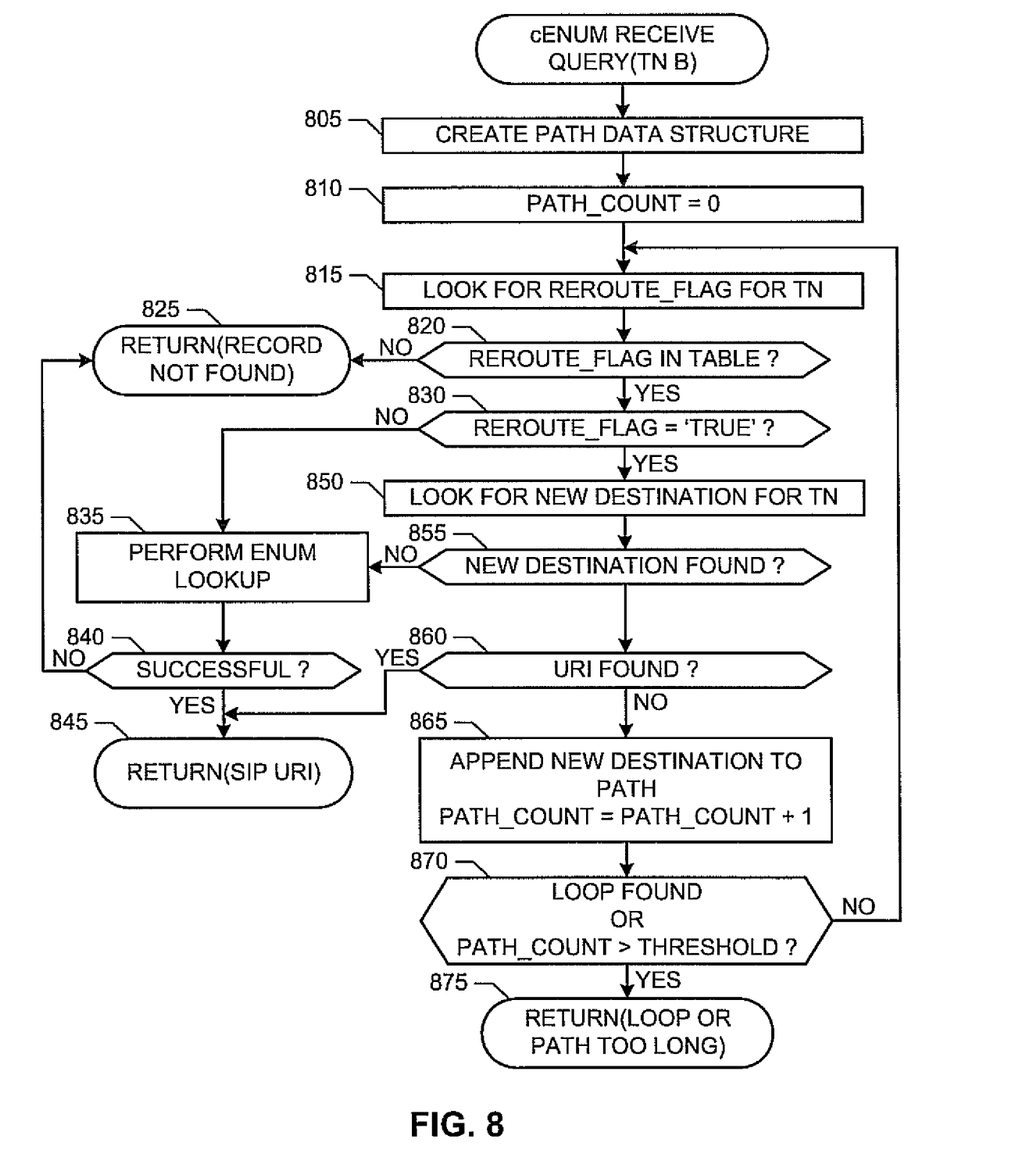
FIG. 8 illustrates example machine accessible instructions that may be executed to implement any or all of the example cENUM servers of FIGS. 1 and 2.
Figure 9:
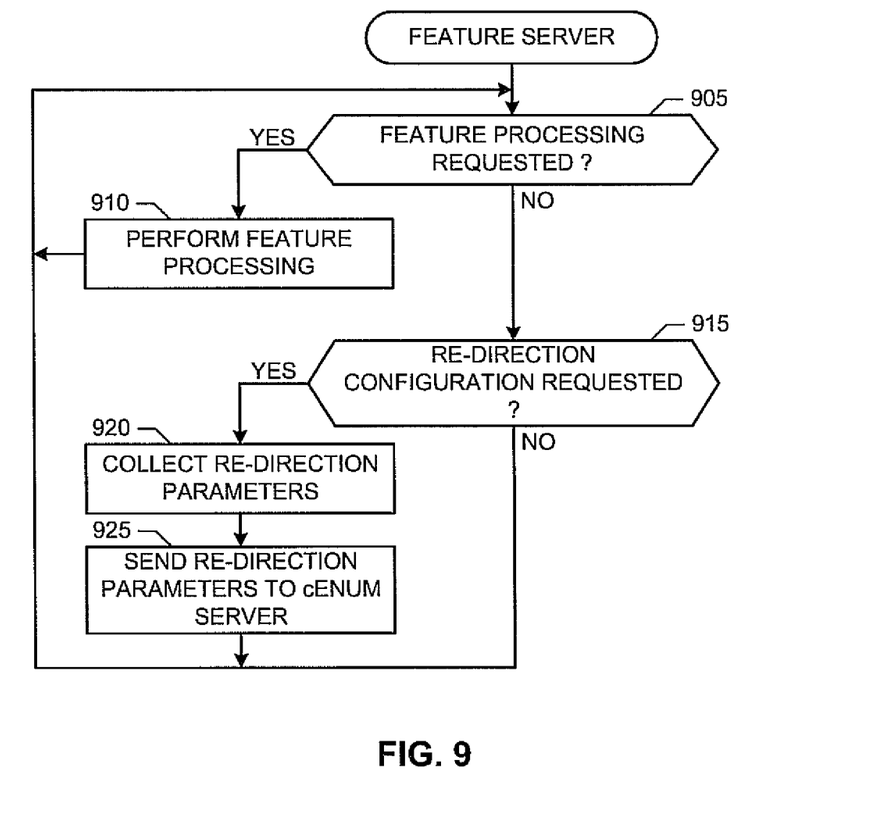
FIG. 9 illustrates example machine accessible instructions that may be executed to implement any or all of the example features servers of FIGS. 1 and 3.

FIG. 8 illustrates example machine accessible instructions that may be executed to implement any or all of the example cENUM servers 130 of FIGS. 1 and 2. FIG. 9 illustrates example machine accessible instructions that may be executed to implement any or all of the example feature servers 155-157 of FIGS. 1 and 3. The example machine accessible instructions of FIGS. 8 and/or 9 may be carried out by a processor, a controller and/or any other suitable processing device. For example, the example machine accessible instructions of FIGS. 8 and/or 9 may be embodied in coded instructions stored on a tangible medium such as a flash memory, a ROM and/or RAM associated with a processor (e.g., the example processor 1005 discussed below in connection with FIG. 10). Alternatively, some or all of the example machine accessible instructions of FIGS. 8 and/or 9 may be implemented using any combination(s) of ASIC(s), PLD(s), FPLD(s), discrete logic, hardware, firmware, etc. Also, some or all of the example machine accessible instructions of FIGS. 8 and/or 9 may be implemented manually or as any combination of any of the foregoing techniques, for example, any combination of firmware, software, discrete logic and/or hardware. Further, although the example machine accessible instructions are described with reference to the flowcharts of FIGS. 8 and 9, persons of ordinary skill in the art will readily appreciate that many other methods of implementing the machine accessible instructions of FIGS. 8 and/or 9 may be employed. For example, the order of execution of the blocks may be changed, and/or one or more of the blocks described may be changed, eliminated, sub-divided, or combined. Additionally, persons of ordinary skill in the art will appreciate that any or all of the example machine accessible instructions of FIGS. 8 and/or 9 may be carried out sequentially and/or carried out in parallel by, for example, separate processing threads, processors, devices, discrete logic, circuits, etc.

The example machine accessible instructions of FIG. 8 begin when an ENUM query request message is received at a cENUM server (e.g., the example cENUM server 130 of FIG. 1). The example ENUM query request message of FIG. 8 is directed to a telephone number (TN) B. The cENUM server creates a path data structure that is used, as described below, to detect re-direction loops (block 805), and initializes a path count value to zero (block 810). The cENUM server (e.g., the example query redirector 240 of FIG. 2) determines if there is a redirect flag (e.g., one of the example redirect flags 220) defined for TN B (block 815).

If there is no redirect flag defined for TN B (block 820), the cENUM server returns an ENUM response indicating that no record was found (block 825), and control exits from the example machine accessible instructions of FIG. 8. The call will then be processed without redirection (i.e., to the original destination). If there is a redirect flag defined for TN B (block 820), and if the redirect flag indicates that re-directing is inactive (e.g., a logical "FALSE") (block 825), the cENUM server (e.g., the example ENUM querier 250 of FIG. 2) performs an ENUM lookup based on TN B (block 835). If the ENUM lookup is successful (block 840), the cENUM server returns an ENUM response message that specifies the SIP URI for TN B (block 845), and control exits from the example machine accessible instructions of FIG. 8. If the ENUM lookup is not successful (block 840), the cENUM server returns an ENUM response message indicating that no record was found (block 825) and the call will be processed in accordance with techniques performed in the industry. Control then exits from the example machine accessible instructions of FIG. 8.

Returning to block 830, if the redirect flag for TN B is a logical "TRUE" (i.e., re-direction for TN B is active) (block 830), the cENUM server (e.g., the example call rerouting director 245 of FIG. 2) queries rerouting data (e.g., the example rerouting data 225) for a re-direction destination (block 850). If no redirection destination is found (block 855), control proceeds to block 835 to perform an ENUM lookup based on TN B as explained above.

If a redirection destination is found (block 855), and if the redirection destination is a URI (block 860), the cENUM server returns an ENUM response message that specifies the URI for the redirection destination (block 845), and control exits from the example machine accessible instructions of FIG. 8. The call is processed using the returned SIP URI. If the redirection destination is not a URI (e.g., it is a telephone number) (block 860), the redirection destination is appended to the path data structure and the path count is incremented (block 865). If the same destination occurs more than once in the path data structure (i.e., a redirection loop was detected) and/or the path count equals or exceeds a threshold (block 870), the cENUM server returns an ENUM response indicating that a loop was detected and/or that the redirection path was too long (block 875), and control exits from the example machine accessible instructions of FIG. 8 and the call will be processed in accordance with techniques performed in the industry. If a redirection loop was not identified and the path count is less than the threshold (block 870), control returns to block 815 to recursively trace the remainder of the re-direction path. However, upon each return to block 815, the most recently identified redirection destination is used.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or equivalents and successor physical media.

Returning to block 905, if a feature processing request is not received (block 905), the feature server (e.g., the example redirection configurer 315 of FIG. 3) determines if a request to configure re-direction for a destination was received (block 915). If a request to configure re-direction for a destination was not received (block 915), control returns to block 905 to check for a feature processing request.

If a request to configure re-direction for a destination was received (block 915), the redirection configurer prompts, collects, receives and/or otherwise obtains one or more re-direction configuration parameters (block 920) and sends the obtained re-direction configuration parameter(s) to a cENUM server (e.g., the example cENUM server 130) (block 925). Control then returns to block 905 to check for a feature processing request as explained above.

Figure 10:
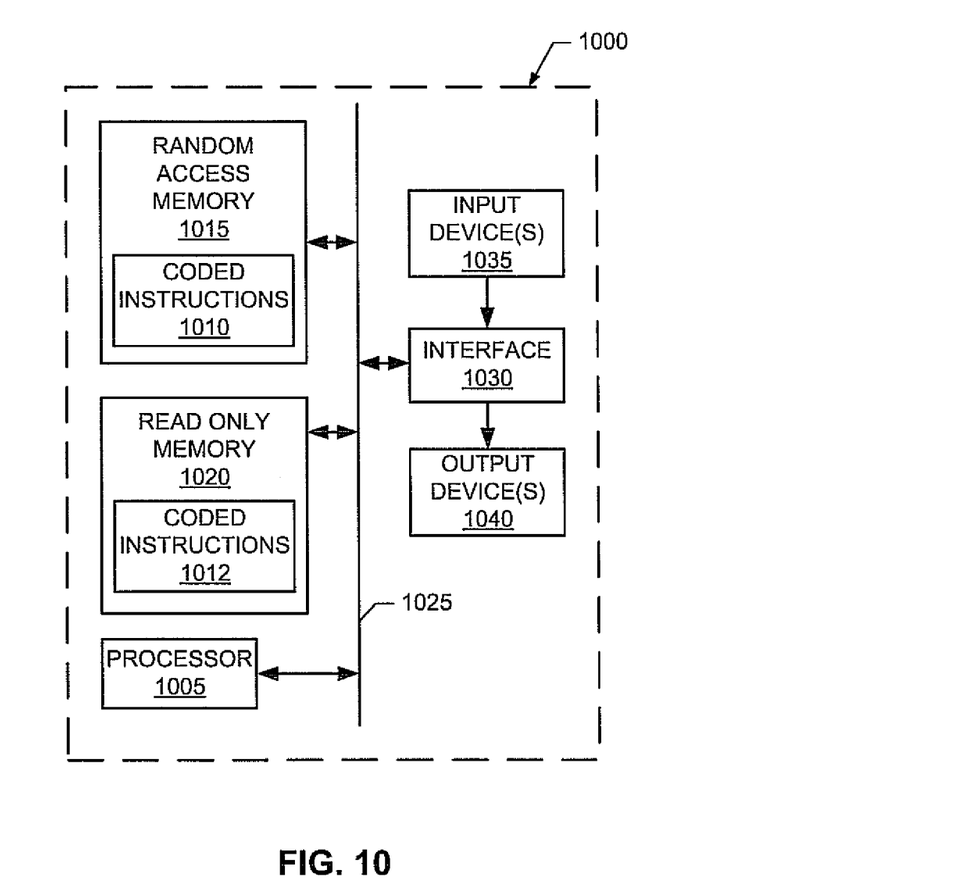
FIG. 10 is a schematic illustration of an example processor platform that may be used and/or programmed to carry out the example message exchanges and/or the example machine accessible instructions of FIGS. 6, 7, 8 and/or 9 to implement any of all of the example methods and apparatus described herein.

FIG. 10 is a schematic diagram of an example processor platform 1000 that may be used and/or programmed to implement all or a portion of any or all of the example S-CSCF servers 125-127, the example cENUM servers 130, the example feature servers 155-157 and/or, more generally, the example IMS network 115 of FIGS. 1-3. For example, the processor platform 1000 can be implemented by one or more general purpose processors, processor cores, microcontrollers, etc.

The processor platform 1000 of the example of FIG. 10 includes at least one general purpose programmable processor 1005. The processor 1005 executes coded instructions 1010 and/or 1012 present in main memory of the processor 1005 (e.g., within a RAM 1015 and/or a ROM 1020). The processor 1005 may be any type of processing unit, such as a processor core, a processor and/or a microcontroller. The processor 1005 may execute, among other things, the example exchanges and/or the example machine accessible instructions of FIGS. 6-9 to implement the example methods and apparatus described herein.

The processor 1005 is in communication with the main memory (including a ROM 1020 and/or the RAM 1015) via a bus 1025. The RAM 1015 may be implemented by DRAM, SDRAM, and/or any other type of RAM device, and ROM may be implemented by flash memory and/or any other desired type of memory device. Access to the memory 1015 and 1020 may be controlled by a memory controller (not shown). The RAM 1015 may be used to store and/or implement, for example, the example redirect flags 220, the example rerouting data 225, the example ENUM database 210, and/or the example subscriber data 320.

The processor platform 1000 also includes an interface circuit 1030. The interface circuit 1030 may be implemented by any type of interface standard, such as an external memory interface, serial port, general purpose input/output, etc. One or more input devices 1035 and one or more output devices 1040 are connected to the interface circuit 1030. The input devices 1035 and/or output devices 1040 may be used to, for example, implement the example interfaces 205, 215 and/or 235 of FIG. 2, and/or the example interfaces 305 and/or 310 of FIG. 3.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
in response to receiving at an electronic telephone number mapping server an electronic telephone number mapping query request message identifying a called first user endpoint called by an originating device from a call server associated with the originating device, determining at the electronic telephone number mapping server whether the called first user endpoint is subject to re-direction;
determining, using a processor at the electronic telephone number mapping server, a second user endpoint when the called first user endpoint is subject to the redirection, the second user endpoint destination being different from the called first user endpoint; and
sending an identifier associated with the second user endpoint from the electronic telephone number mapping server to the call server associated with the originating device when the called first user endpoint is subject to re-direction to thereby enable the call server to convey a communication session initiation message to the second user endpoint without triggering an end-point call feature at the called first user endpoint or at a terminating call server associated with the called first user endpoint.

2. The method as defined in claim 1, wherein the call server is to convey the communication session initiation message to the second user endpoint rather than the called first user endpoint when the called first user endpoint is subject to the redirection.

3. The method as defined in claim 1, further comprising performing an electronic telephone number mapping lookup based on the second user endpoint.

4. The method as defined in claim 1, wherein the identifier comprises a session initiation protocol uniform resource identifier for the second user endpoint.

5. The method as defined in claim 1, further comprising performing an electronic telephone number mapping lookup based upon the called first user endpoint when the called first user endpoint is not subject to redirection.

6. The method as defined in claim 1, wherein determining the second user endpoint comprises:
identifying a first destination based on the called first user endpoint; and
performing an electronic telephone number mapping lookup based on the first destination when the first destination is a telephone number.

7. The method as defined in claim 6, further comprising returning the first destination without performing the electronic telephone number mapping lookup based on the first destination when the first destination is a session initiation protocol uniform resource identifier.

8. The method as defined in claim 1, wherein determining the second user endpoint comprises:
identifying a first destination based on the called first user endpoint;
determining if the first destination is subject to redirection;
identifying a second destination based on the first destination; and
returning the second destination.

9. The method as defined in claim 8, further comprising performing an electronic telephone number mapping lookup based on the second destination when the second destination is a telephone number.

10. The method as defined in claim 8, further comprising returning the second destination without performing an electronic telephone number mapping lookup based on the second destination when the second destination is a session initiation protocol uniform resource identifier.

11. An electronic telephone number mapping server comprising:
a memory having machine readable instructions; and
a processor to execute the instructions to perform operations comprising:
identifying whether a communication session directed to a first called user endpoint specified in an electronic telephone number mapping query request message is to be re-directed, the electronic telephone number mapping query request message being received from a call server associated with an originating device that initiated a call to the first called user endpoint, the query request message being based on the call;
identifying a second user endpoint for the communication session when the communication session is to be re-directed, the second user endpoint being different than the first called user endpoint; and
returning an identifier associated with the second user endpoint to the call server associated with the originating device when the communication session is to be re-directed to thereby enable the call server to convey a communication session initiation message to the second user endpoint without triggering an end-point call feature at the first called user endpoint or at a terminating call server associated with the first called user endpoint.

12. The server as defined in claim 11, wherein the operations further comprise returning a second identifier associated with the first called user endpoint when the communication session is not to be re-directed.

13. The server as defined in claim 11, wherein the identifier comprises a session initiation protocol uniform resource identifier.

14. The server as defined in claim 11, wherein the operations further comprise identifying a session initiation protocol uniform resource identifier associated with the second user endpoint when the communication session is to be re-directed.

15. The server as defined in claim 11, wherein identifying the second user endpoint comprises:
performing a first lookup of a first data structure to obtain a second destination, the first lookup performed based on the first called user endpoint; and
performing a second lookup of a second data structure to obtain the second user endpoint, the second lookup performed based on the second destination.

16. The server as defined in claim 15, wherein the second data structure comprises the first data structure.

17. The server as defined in claim 15, wherein the second data structure is an electronic telephone number mapping database.

18. The server as defined in claim 11, wherein the first called user endpoint and the second user endpoint are specified with E.164 telephone numbers.

19. The server as defined in claim 11, wherein the second user endpoint is specified with a session initiation protocol uniform resource identifier.

20. The server as defined in claim 11, wherein the operations further comprise checking a value of a redirect flag to determine whether the communication session is to be re-directed.

21. The server as defined in claim 20, wherein the operations further comprise providing an Internet protocol Multimedia Subsystem feature server access to the redirect flag.

22. The server as defined in claim 11, wherein the operations further comprise updating a value representing the second user endpoint.

23. The server as defined in claim 22, wherein the operations further comprise providing a voice over Internet protocol feature server access to the value.

24. A tangible article of manufacture excluding propagating signals and storing machine readable instructions that, when executed, cause a machine to perform operations comprising:
in response to receiving at an electronic telephone number mapping query server an electronic telephone number mapping query request message identifying a first user endpoint called by an originating device from a call server associated with the originating device, determining whether the called first user endpoint is subject to re-direction;
determining at the electronic telephone number mapping server a second user endpoint when the first user endpoint is subject to re-direction, the second user endpoint being different from the called first user endpoint; and
sending an identifier associated with the second user endpoint from the electronic telephone number mapping server to the call server associated with the originating device when the first user endpoint is subject to re-direction to thereby enable the call server to convey a communication session initiation message to the second user endpoint without triggering an end-point call feature at the first user endpoint or at a terminating call server associated with the first user endpoint.

25. The tangible article of manufacture as defined in claim 24, wherein the call server is to send the communication session initiation message to the second user endpoint rather than the called first user endpoint when the called first user endpoint is subject to the redirection.

26. The tangible article of manufacture as defined in claim 24, wherein the operations further comprise performing an electronic telephone number mapping lookup based on the second user endpoint.

27. The tangible article of manufacture as defined in claim 24, wherein the identifier comprises a session initiation protocol uniform resource identifier for the second user endpoint.

28. The tangible article of manufacture as defined in claim 24, wherein the operations further comprise performing an electronic telephone number mapping lookup based upon the called first user endpoint when the called first user endpoint is not subject to re-direction.

29. The tangible article of manufacture as defined in claim 24, wherein determining the second user endpoint comprises:
identifying a first destination based on the called first user endpoint; and
performing an electronic telephone number mapping lookup based on the first destination when the first destination is a telephone number.

30. The tangible article of manufacture as defined in claim 24, wherein determining the second user endpoint comprises:
identifying a first destination based on the called first user endpoint;
determining if the first destination is subject to redirection;
identifying a second destination based on the first destination; and
returning the second destination.

31. The method as defined in claim 1, wherein the called first user endpoint is subject to re-direction when call-forwarding is configured for the called first user endpoint.

32. The method as defined in claim 1, further comprising performing cut-through communication session routing from the originating device to the second user endpoint based on the second user endpoint determined at the electronic telephone number mapping server.

* * * * *